US012564833B2

(12) United States Patent  (10) Patent No.: US 12,564,833 B2
Liu et al.  (45) Date of Patent: Mar. 3, 2026

(54) KIT FOR ISOLATION OF PLATELET-RICH PLASMA AND THE METHOD USING THE SAME

(71) Applicant: KARTIGEN BIOMEDICAL INC., Taipei City (TW)

(72) Inventors: Hwa-Chang Liu, Taipei City (TW); Feng-Huei Lin, Taipei City (TW); Chun-Che Yen, Taipei City (TW)

(73) Assignee: KARTIGEN BIOMEDICAL INC., Taipei City (TW)

( * ) Notice: Subject to any disclaimer, the term of this patent is extended or adjusted under 35 U.S.C. 154(b) by 258 days.

(21) Appl. No.: 18/438,143

(22) Filed: Feb. 9, 2024

(65) Prior Publication Data

US 2024/0238777 A1     Jul. 18, 2024

Related U.S. Application Data

(62) Division of application No. 17/071,375, filed on Oct. 15, 2020, now abandoned.

(51) Int. Cl.
*B01L 3/00* (2006.01)
*B01D 21/26* (2006.01)
(52) U.S. Cl.
CPC .......... *B01L 3/5021* (2013.01); *B01D 21/262* (2013.01); *B01L 2200/028* (2013.01); *B01L 2300/042* (2013.01); *B01L 2300/047* (2013.01); *B01L 2300/0681* (2013.01); *B01L 2400/0409* (2013.01)

(58) Field of Classification Search
CPC ............. B01L 3/5021; B01L 2200/028; B01L 2300/042; B01L 2300/047; B01L 2300/0681; B01L 2400/0409; B01D 21/262; A61K 35/00
See application file for complete search history.

(56) References Cited

U.S. PATENT DOCUMENTS

| | | | |
|---|---|---|---|
| 4,021,352 A | 5/1977 | Sarstedt | |
| 4,534,863 A | 8/1985 | Bacon et al. | |
| 5,652,148 A | 7/1997 | Doshe et al. | |
| 10,578,606 B2 * | 3/2020 | Bokka Srinivasa Rao | .................. B01D 15/10 |
| 10,772,916 B2 * | 9/2020 | Min | .................... A61M 1/0286 |
| 2002/0185457 A1 * | 12/2002 | Smith | ................... B04B 5/0414 210/806 |

* cited by examiner

*Primary Examiner* — Liam Royce
(74) *Attorney, Agent, or Firm* — Birch, Stewart, Kolasch & Birch, LLP

(57) ABSTRACT

Provided herein is a kit for isolation of platelet-rich plasma, comprising a first isolation tube and a second isolation tube. The first isolation tube comprises a first opening and a second opening, and the second isolation tube comprises a first portion, a second portion, and a filter, wherein the first portion has a third opening, the filter is disposed between the first portion and the second portion, the second opening has a diameter in a range of 1 to 5 mm and the filter has a pore size in a range of 1.5 to 4 μm.

6 Claims, 4 Drawing Sheets

FGF-2

TGF-β1

KIT FOR ISOLATION OF PLATELET-RICH PLASMA AND THE METHOD USING THE SAME

This application is a Divisional of co-pending U.S. application Ser. No. 17/071,375, filed on Oct. 15, 2020. The above application is hereby expressly incorporated by reference, in its entirety, into the present application.

FIELD OF THE INVENTION

The present disclosure is related to a kit for isolation of platelet-rich plasma and the method using the same.

BACKGROUND OF THE INVENTION

Platelet-RICH plasma (PRP) contained buffy coat with rich of platelet and growth factors has introduced to have a better effect on tissue repair, especially in bone, cartilage, skin, dental alveolar tissue and even as drug/cell carrier for controlled release.

PRP is a blood plasma containing higher-than-baseline levels of platelets. It can be activated by adding thrombin or calcium chloride ($CaCl_2$) wherein will release the growth factors from alpha granules like fibroblast growth factor-2 (FGF-2), transforming growth factor-beta 1 (TGF-ß1), bone morphogenic growth factor-2 (BMP2), insulin-like growth factors 1 (IGF1), platelet-derived growth factor (PDGF), and the other cytokines. Those are valuable in stimulating, signaling, and promoting cells to involve in tissue repair process. Up to date, the varieties of commercial PRP kits are available on the market where each shows a different predominance in the final products, for instance, the number of harvested platelets, the percentage of leukocytes or erythrocytes, the final volume PRP, price and operation time. Many commercialized PRP preparation kits on the market followed the protocol as did in fibrin glue preparation; that might be less plasma volume, limited platelet number, too many leucocyte/erythrocytes and inadequate fibrin ultrastructure. Currently, several new PRP devices or kits coming up to the market are generally to use the protocols more readily and user-friendly than before. Even though the first-line clinical people are still not satisfied with most of the PRP kits, no matter in a final volume of PRP, platelet number, the concentration of growth factors, the number of leukocytes/erythrocytes, or fibrin ultra-structure.

The commercialized PRP kits could be divided into two categories: plasma-based kits and buffy-coat-based kits; that could be briefly described as follows. To collect platelet from whole blood by centrifugation process as the conventional way brings the whole blood into three layers: (1) plasma layer on the top takes about 55% of whole blood and consists mostly of the least dense component, (2) buffy-coat stays at the middle layer that is less than 1% of whole blood and is very rich in leucocytes & platelets, (3) the erythrocytes rest at bottom is about 45% of whole blood.[16] The plasma-based kits harvest only the top plasma layer with fewer platelet; on the contrary, the buffy-coat kits harvest both plasma layer and buffy-coat with a higher concentration of platelet as so-called platelet-rich plasma, PRP in short. The platelet could release more growth factors to induce local cells or mesenchymal stem cells to join the repair processes during tissue healing; so that the buffy-coat kits are more welcome to be used in tissue repair or regeneration. The work of the commercial buffy-coat kits available today are commonly based on blood-component density. However, the blood elements are very close in density that makes the separation of blood elements being a big challenge if just by traditional centrifugation. Therefore, the aforementioned commercialized buffy-coat kits are generally contaminated by leucocytes that would induce local inflammation to deteriorate healing process, or filtration by erythrocyte that might lead to local cells necrosis. In addition, the number of granulocytes in PRPs would interfere the formation of fibrin ultra-structure, such as fibrin diameter, pore size and porosity etc., that may be related to the cell migration during the healing process.

In view of this, a need exists for an improved approach which is capable to efficiently separate the platelet from blood plasma, particularly from white blood cells and red blood cells and obtain the platelet-rich plasma.

SUMMARY OF THE INVENTION

One aspect provided herein is a kit for isolation of platelet-rich plasma, comprising: a first isolation tube and a second isolation tube. The first isolation tube comprises a first opening and a second opening, and the second isolation tube comprises a first portion, a second portion, and a filter; wherein the first portion has a third opening, the filter is disposed between the first portion and the second portion, the second opening has a diameter in a range of 1 to 5 mm and the filter has a pore size in a range of 1.5 to 4 µm.

Another aspect provided herein is a method of isolation of platelet-rich plasma, comprising: providing the kit of the present disclosure; disposing a blood sample in the first isolation tube through the first opening; centrifuging the first isolation tube to separate a bottom layer, a buffy coat layer, and an upper layer; discarding the bottom layer from the second opening; transferring the buffy coat and the top layer to the second isolation tube through the third opening; centrifuging the second isolation tube to collect the platelet-rich plasma in the second portion.

Other objects, advantages, and features of the disclosure will become more apparent from the following detailed description when taken in conjunction with the accompanying drawings.

BRIEF DESCRIPTION OF THE DRAWINGS

For the purpose of illustrating the invention, there are shown in the drawings embodiments which are presently preferred. It should be understood, however, that the invention is not limited to the preferred embodiments shown.

In the drawings:

FIGS. 1A and 1B show the illustrative view of the kit according to the present disclosure wherein FIG. 1A shows a first isolation tube and FIG. 1B shows a second isolation tube.

FIGS. 3A and 3B show the concentration of the growth factor released from activated PRPs of all groups set forth in Table 1 wherein FIG. 3A shows FGF-2 and FIG. 3B shows TGF-β1; the same mark (a, b, c, d, or d) means no significant statistical difference, and significance levels were indicated as * ($p < 0.05$),  ($p < 0.01$), and * ($p < 0.001$).

DETAILED DESCRIPTION OF THE INVENTION

The following embodiments when read with the accompanying drawings are made to clearly exhibit the abovementioned and other technical contents, features and effects of the present disclosure. Through the exposition by means of the specific embodiments, people would further understand the technical means and effects of the present disclosure adopted to achieve the above-indicated objectives. Moreover, as the contents disclosed herein can be readily understood and implemented by a person skilled in the art, all equivalent changes or modifications which do not depart from the concept of the present disclosure shall be encompassed by the appended claims.

Furthermore, the ordinals recited in the specification and the claims such as "first", "second" and so on are intended only to describe the elements claimed and imply or represent neither that the claimed elements have any proceeding ordinals, nor the sequence between one claimed element and another claimed element or between steps of a manufacturing method. The use of these ordinals is merely to differentiate one claimed element having a certain designation from another claimed element having the same designation.

Furthermore, the terms recited in the specifications and the claims such as "on" are intended not only directly contact with the other element, but also intended indirectly contact with the other element.

Kit For Isolation of Platelet-Rich Plasma (PRP)

Figure 1A:
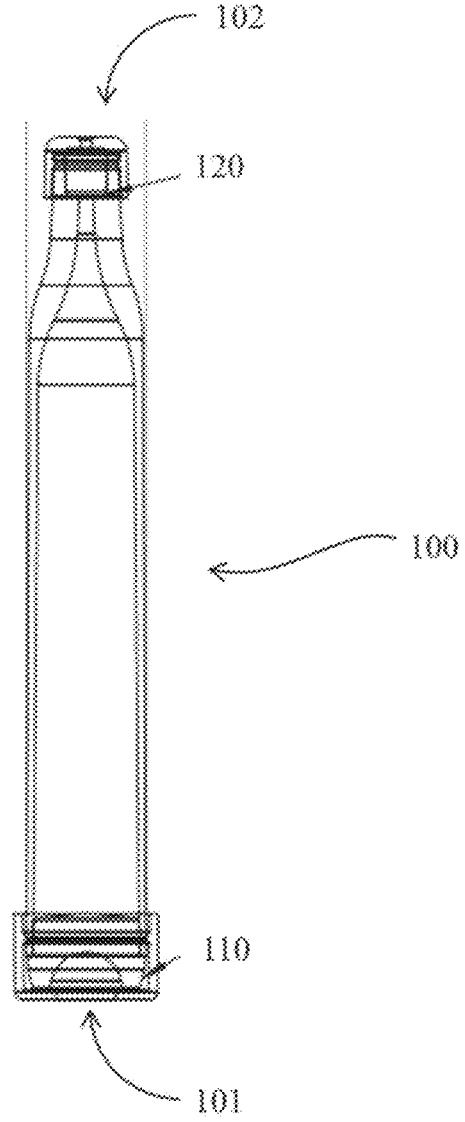
Figure 1B:
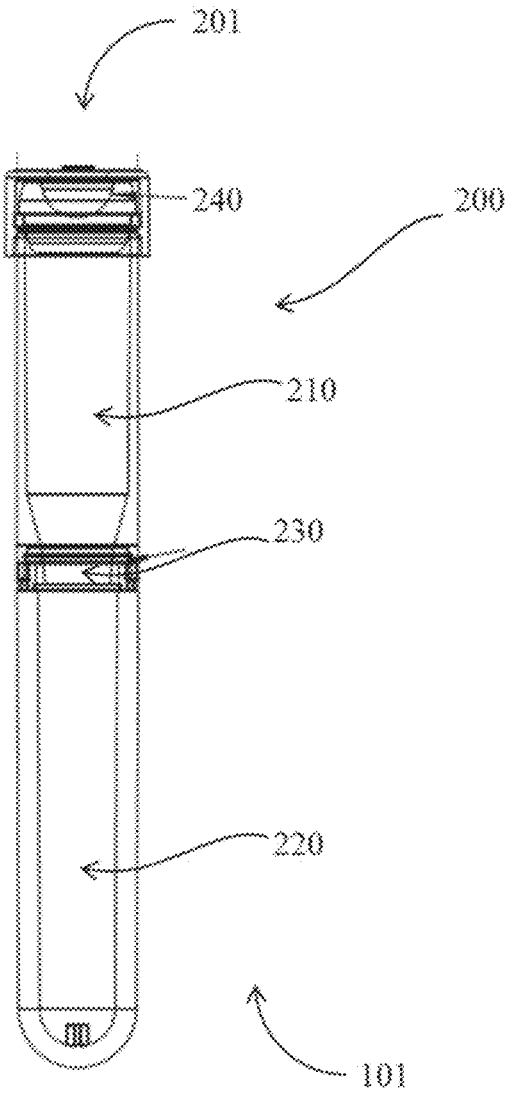
Figure 2:
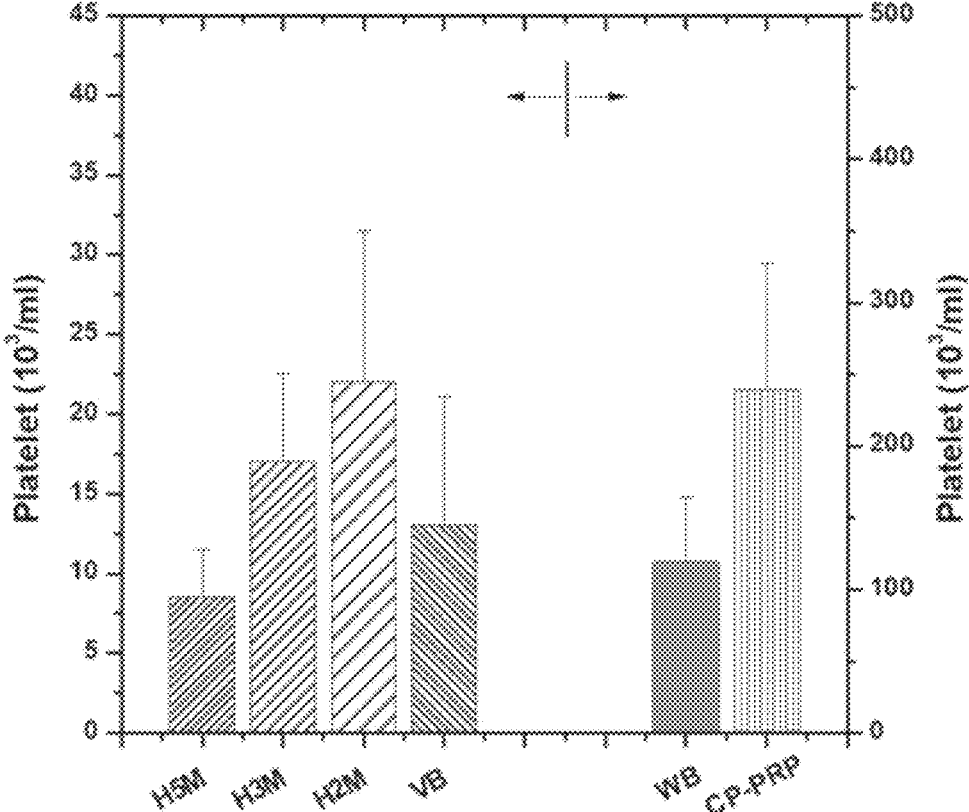
FIG. 2 shows the number of platelets of PRPs isolated by the kit of the present disclosure, commercialized PRP kits, whole blood (WB), and conventional protocol PRP (CP-PRP).

Please refer to FIGS. 1A, 1B, and 2. The kit for isolation of PRP comprises a first isolation tube 100 and a second isolation tube 200. The first isolation tube 100 has a first opening 101 and a second opening 102. In a preferred second portion 220 connect to each other and the filter 230 is disposed between the first portion 210 and the second portion 220. The filter 230 has a pore size in a range of 1.5 to 4 μm. A third cap is disposed on the third opening. Hence in the present disclosure, the first, second, and third cap 110, 120, 240 would cover the first, second, and third opening 101, 102, 201 respectively.

In a particular embodiment, the ratio of the first portion 210 and the second portion 220 is between 45:55 to 35:65. In a preferred embodiment, the ratio of the first portion 210 and the second portion 220 is approximately 40:60.

In a particular embodiment, the length of the first isolation tube 100 and the second isolation tube 200 is between 10 to 20 cm.

In a particular embodiment, the first portion 100 and the second portion 200 are dismantlable. However, in another embodiment, the first portion 100 and the second portion 200 are in one piece.

Example 1 Preparation of Blood Sample and Isolation of Platelet-Rich Plasma (PRP)

A total volume of 500 ml of whole blood harvested from a swine by an internal jugular venipuncture supplemented with ACD-A anticoagulant (GBiosciences, USA). The blood sample was divided into eight groups to isolate PRP by different protocol, as disclosed in Table 1.

TABLE 1

| Group | Abbreviation of the isolated product | Description |
| --- | --- | --- |
| Whole Blood | WB | The whole blood directly harvested from a donor |
| Conventional protocol | CP-PRP | The whole blood was harvested from a donor and go one-round centrifugation by 1600 g force to turn whole blood into three layers. The top two layers were collected and the bottom layer was discarded. |
| Tube inserted with 5 μm filter | H5M | Platelet-rich plasma was isolated according to the method disclosed herein, wherein the filter has a cut-off pore size of 5 μm. The second tube is placed in a centrifuge; and then the leukocytes are further filtered out by 2300 g force from the product. |
| Tube inserted with 3 μm filter | H3M | Platelet-rich plasma was isolated according to the method disclosed herein, wherein the filter has a cut-off pore size of 3 μm. The second tube is placed in a centrifuge; and then the leukocytes are further filtered out by 2300 g force from the product. |
| Tube inserted with 2 μm filter | H2M | Platelet-rich plasma was isolated according to the method disclosed herein, wherein the filter has a cut-off pore size of 2 μm. The second tube is placed in a centrifuge; and then the leukocytes are further filtered out by 2300 g force from the product. |
| Commercial kit | VB | Commercialized PRP kit | embodiment, the diameter of the first opening 101 is larger than the diameter of the second opening 102. In a more preferred embodiment, the second opening 102 has a diameter in a range of 1 to 5 mm. A first cap 110 is disposed on the first opening 101 and a second cap 120 is disposed on the second opening 102. As shown in FIG. 1A, the diameter of the first isolation tube 100 reduces in the portion near the second opening 102 and form a tip-shape accordingly.

The second isolation tube comprises 200 a first portion 210, a second portion 220, and a filter 230. The first portion 210 has a third opening 201. The first portion 210 and the PRP is isolated by a two-step process. Firstly, a blood sample is disposed in a first isolation tube through the first opening. The first centrifugation is performed to separate a bottom layer, a buffy coat layer, and an upper layer in the first isolation tube. The bottom layer is discarded from the second opening and then the buffy coat and the top layers are transferred to the second isolation tube through the third opening, i.e. are disposed in the first portion. The second centrifugation is performed to spin down the plasma in the second isolation tube. As a consequence, the plasma passes through the filter and the PRP is collected in the second portion, whereas the leukocyte is detained in the filter.

Example 2 Complete Blood Count

The concentration blood cells and platelets are counted in order to assess the efficiency of isolation. The isolation groups disclosed in Table 1 are respectively counted for the platelet, white blood cells, and red blood cells within by an automated veterinary hematology analyzer (IDEXX Procyte Dx) for complete blood count (CBC). The results are shown in FIG. 2 and Table 2.

Table 3 was to summarize the formulae for the counting and evaluation to all the blood cellular components.

Unless otherwise described, the experiment data in the present disclosure are presented as mean ±S.D by using GraphPad Prism software 6. The data were analyzed by one-way ANOVA, followed by Tukey multiple comparison test with significance levels were indicated as * $p < 0.05$,  $p < 0.01$, and * $p < 0.001$.

As shown in FIG. 2, the platelet concentration of group CP-PRP and group WB (whole blood) were $239 \times 10^3/\mu l$ and $119 \times 10^3/\mu l$, respectively; which was approximately 2-times rich. The platelet number for group H5M, group H3M, group H2M, and group VB are $8.5 \times 10^3/\mu l$, $17.0 \times 10^3/\mu l$, $22.0 \times 10^3/\mu l$, and $13.0 \times 10^3/\mu l$, respectively. Among these, the group H2M showed the highest platelet number. Although the platelet concentration of group CP-PRP and group WB was much higher than that of group H2M, however, in view of Table 2, the white blood cells (WBCs) yield in the CP-PRP is much higher than those in H2M, H3M, and H5M and thus the PRP collected in group CP-PRP is probable of causing the intensifying of the local inflammation. WB contained too much both in WBCs and red blood cells (RBCs) that may not only induce local inflammation but also slow down the healing process.

TABLE 3-continued $$D. \; WBC \; \text{Yield} \; (WY \; \%) = \frac{\text{volume of product (ml)} \times WBC \, \text{concentration in product} \left( \times 10^9/\text{L} \right)}{\text{volume of } WB \text{ collected (ml)} \times WBC \, \text{concentration in } WB \left( \times 10^9/\text{L} \right)} \times 100$$

Table 2 shows the summary of blood count and the concentration of isolated PRPs yielded. The groups according to the present disclosure, which employ the kit of the present disclosure, including groups H5M, H3M, and H2M collected relatively high final volume and volume yield of PRPs from the whole blood, than those of commercialized kits of group VB The PRP in the groups according to the present disclosure were successfully and efficiently isolated because the filter is permeable only for the platelets and detain other cells.

The groups H2M, H3M, and H5M according to the present disclosure could effectively separate RBCs and WBCs from PRPs, especially for the H2M group. Moreover, the RBCs in groups H5M and H3M are reduced to 0.05% and 0.01%, respectively, which is significantly lower than the CP-PRP group (conventional protocol).

Accordingly, PRPs isolated by the kit according to the present disclosure (H2M, H3M, and H5M) yield better volume and platelet concentration, which implies that the kit and the method according to the present disclosure efficiently and successfully isolates the PRP from whole blood sample and only extremely low or even no erythrocyte and leukocyte is present in the final product.

Example 3 Growth Factor Quantification

The growth factors quantification of PRPs including fibroblast growth factor-2 (FGF-2) and tumor growth factor-

TABLE 2

| PRP kits | Initial volume (ml) | Final volume (ml) | Volume Yield (VY %) | Platelet Yield (PY %) | RBC Yield (RY %) | WBC Yield (WY %) |
|---|---|---|---|---|---|---|
| CP-PRP | 30 | 15.65 ± 1.32 | 50.24 ± 4.40 | 100.90 ± 8.83 | 0.18 ± 0.03 | 27.83 ± 15.94 |
| H5M | 4 | 1.93 ± 0.09 | 48.13 ± 2.29 | 3.44 ± 0.16 | 0.05 ± 0.02 | 0 |
| H3M | 4 | 1.82 ± 0.09 | 45.39 ± 2.37 | 6.48 ± 0.34 | 0.01 ± 0.00 | 0 |
| H2M | 4 | 1.82 ± 0.09 | 45.39 ± 2.37 | 8.39 ± 0.44 | 0 | 0 |
| Commercial Kit | 10 | 3.833 ± 0.29 | 38.33 ± 1.44 | 4.19 ± 0.16 | 0 | 5.3 |

TABLE 3

$$A. \; \text{Volume Yield} \, (VY \; \%) = \frac{\text{volume of product (ml)}}{\text{volume of } WB \text{ processed (ml)}} \times 100$$

$$B. \; \text{Platelet Yield} \; (PY \; \%) = \frac{\text{volume of product (ml)} \times \text{Platelet concentration in product} \left( \times 10^9/\mu \text{L} \right)}{\text{volume of } WB \text{ collected (ml)} \times \text{Platelet concentration in } WB \left( \times 10^9/\mu \text{L} \right)} \times 100$$

$$C. \; RBC \; \text{Yield} \; (RY \; \%) = \frac{\text{volume of product (ml)} \times RBC \, \text{concentration in product} \left( \times 10^9/\text{L} \right)}{\text{volume of } WB \text{ collected (ml)} \times RBC \, \text{concentration in } WB \left( \times 10^9/\text{L} \right)} \times 100$$

beta-1 (TGF-β1) were quantified by using ELISA kits (Wuhan USCN Business. Co., Ltd., USA) according to the user instructions.

Figure 3A:
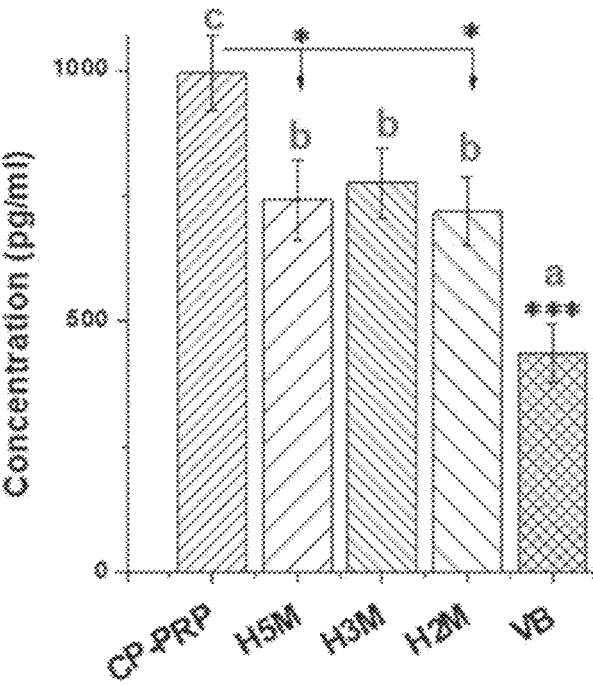
Figure 3B:
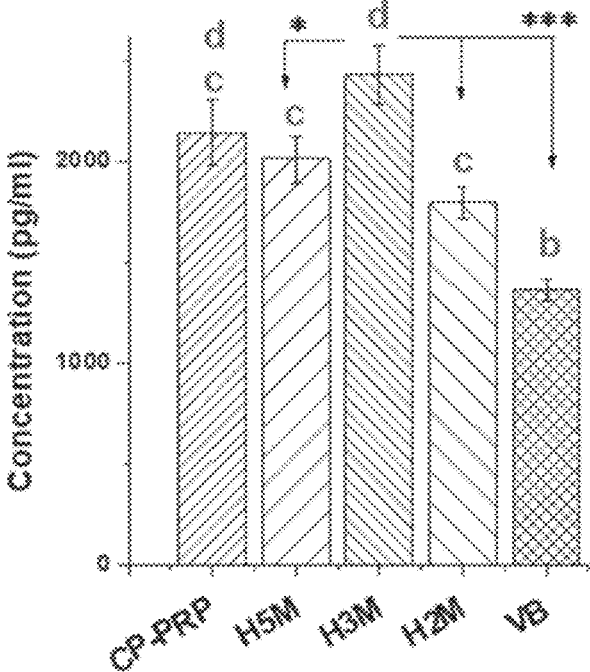

The growth factors quantification of the prepared PRPs were shown in FIGS. 3A and 3B. The concentration of growth factors, FGF-2, and TGFß-1 in the PRPs prepared from groups H2M, H3M, and H5M according to the present disclosure and CP group were all far above average. The concentrations of growth factors in PRPs prepared from the other commercialized kit were fluctuation very much.

As for the concentration of FGF-2 (FIG. 3A), the concentration in group H5M, group H3M, group H2M, and group CP were all higher than 750 pg/ml. The concentration in group VB was lower than 500 pg/ml.

As for the concentration of TGFß-1 (FIG. 3B), the concentration in group H5M, group H3M, group H2M, and group CP were all higher than 1750 pg/ml. The concentration in group VB was lower than 1500 pg/ml.

The results demonstrates that the concentrations of growth factors in group using the kit according to the present disclosure were relatively stable and far above average.

While preferred embodiments of the present invention have been shown and described herein, it will be obvious to those skilled in the art that such embodiments are provided by way of example only and can be implemented in combinations. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of isolation of platelet-rich plasma, comprising:

providing a kit comprising:

a first isolation tube, comprising a first opening and a second opening, and a second isolation tube, comprising a first portion, a second portion, and a filter;

wherein a length of the first isolation tube and the second isolation tube is between 10 to 20 cm, and wherein the first portion of the second isolation tube has a third opening, wherein the filter is disposed between the first portion and the second portion, wherein the second opening has a diameter in a range of 1 to 5 mm, wherein a diameter of the first isolation tube reduces toward the second opening and forms a tip, wherein the filter has a pore size in a range of 1.5 to 4 μm, and wherein the filter is permeable only for platelets and plasma and the filter is impermeable to leukocytes;

disposing a blood sample in the first isolation tube through the first opening;

centrifuging the first isolation tube to separate a bottom layer, a buffy coat layer, and an upper layer;

discarding the bottom layer from the second opening;

transferring the buffy coat and the top layer to the second isolation tube through the third opening;

centrifuging the second isolation tube to collect the platelet-rich plasma having little or no erythrocytes and leukocytes present in the second portion.

2. The method of claim 1, wherein the centrifugation is performed by 2,200 to 2,400 g.

3. The method of claim 1, wherein a ratio of lengths of the first portion and the second portion of the second isolation tube is between 45:55 to 35:65.

4. The method of claim 3, wherein the ratio of lengths of the first portion and the second portion of the second isolation tube is approximately 40:60.

5. The method of claim 1, wherein the first portion and the second portion of the second isolation tube are dismantlable.

6. The method of claim 1, further comprising a first cap, a second cap, and a third cap to cover the first opening, the second opening, and the third opening, respectively.

* * * * *